(12) United States Patent
Apostolopoulos

(10) Patent No.: US 7,103,669 B2
(45) Date of Patent: Sep. 5, 2006

(54) VIDEO COMMUNICATION METHOD AND SYSTEM EMPLOYING MULTIPLE STATE ENCODING AND PATH DIVERSITY

(75) Inventor: John G. Apostolopoulos, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1102 days.

(21) Appl. No.: 09/784,223

(22) Filed: Feb. 16, 2001

(65) Prior Publication Data

US 2002/0116715 A1   Aug. 22, 2002

(51) Int. Cl.
*G06F 15/16* (2006.01)
(52) U.S. Cl. ............... 709/231; 709/236; 375/240.12; 375/240.26; 370/442; 370/487
(58) Field of Classification Search ............... 709/231, 709/235, 236; 375/240.12, 240.26; 370/442, 370/487
See application file for complete search history.

(56) References Cited

U.S. PATENT DOCUMENTS

| | | | | | |
|---|---|---|---|---|---|
| 4,935,816 | A | * | 6/1990 | Faber | 348/578 |
| 6,078,328 | A | * | 6/2000 | Schumann et al. | 345/418 |
| 6,104,757 | A | * | 8/2000 | Rhee | 375/240.12 |
| 6,317,462 | B1 | * | 11/2001 | Boyce | 375/240.27 |
| 6,400,767 | B1 | * | 6/2002 | Nuber et al. | 375/240.26 |
| 6,421,387 | B1 | * | 7/2002 | Rhee | 375/240.27 |
| 6,611,530 | B1 | * | 8/2003 | Apostolopoulos | 370/442 |
| 6,629,318 | B1 | * | 9/2003 | Radha et al. | 725/134 |
| 6,680,976 | B1 | * | 1/2004 | Chen et al. | 375/240.26 |
| 6,757,735 | B1 | * | 6/2004 | Apostolopulos et al. | 709/231 |
| 2001/0009547 | A1 | * | 7/2001 | Jinzaki et al. | 370/390 |

OTHER PUBLICATIONS

Error-Resilient Video Compression, John G. Apostolopoulos, Sep. 1999 SPIE vol. 3845.*
Reliable Video Communication over Lossy Packet Networks using Multiple State Encoding and Path Diversity, John G. Apostolopoulos, 2001 SPIE vol. 4310.*

(Continued)

*Primary Examiner*—Khanh Quang Dinh
*Assistant Examiner*—Van Nguyen

(57) ABSTRACT

Video communication over lossy packet networks such as the Internet is hampered by limited bandwidth and packet loss. The present invention provides a system for providing reliable video communication over these networks, where the system includes at least two jointly designed subsystems: (1) multiple state video coding system and (2) path diversity transmission system. Multiple state video coding combats the problem of error propagation that results from packet loss by coding the video into multiple independently decodable streams, each with its own prediction process and state. If one stream is lost the other streams can still be decoded to produce usable video, and furthermore, the correctly received streams provide bidirectional (i.e., previous and future) information that enables improved state recovery for the corrupted stream. The path diversity transmission system explicitly sends different subsets of packets over different paths, as opposed to the prior art approaches where the packets proceed along a single path. By explicitly sending different subsets of packets over different paths, the path diversity transmission system enables the end-to-end video application to effectively see an average path behavior, which is referred to herein as path diversity. Generally, seeing this average path behavior provides better performance than seeing the behavior of any individual random path. The resulting path diversity provides the multiple state video decoder with an appropriate virtual channel to assist in recovering from lost packets, and can also simplify system design (e.g., forward error correction design).

20 Claims, 11 Drawing Sheets

OTHER PUBLICATIONS

Erro-Resilient Transcoding using Adaptive Intra Refresh for Video Streaming, Hong-Jyh Chiou et al, IEEE 2004.*

Frame Adaptive Vector Quantization for Image Sequence Coding, Goldberg et al, IEEE 1988.*

* cited by examiner

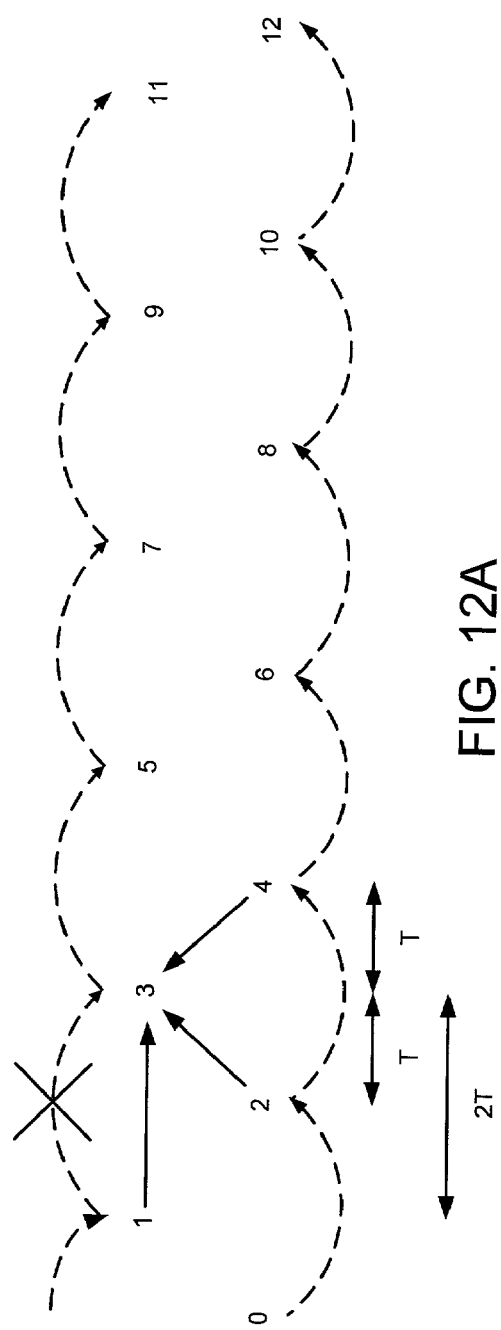
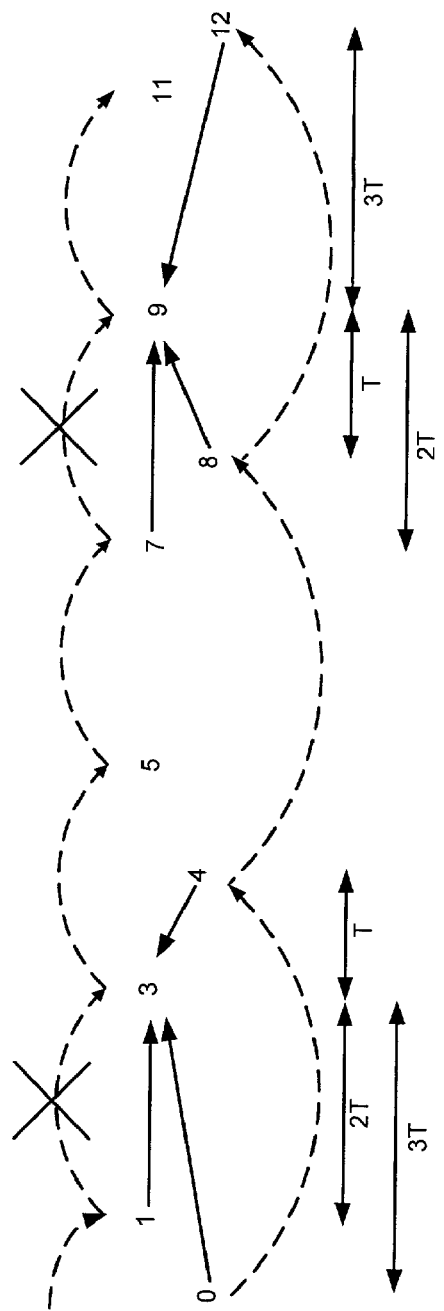
FIG. 12A
FIG. 12B

VIDEO COMMUNICATION METHOD AND SYSTEM EMPLOYING MULTIPLE STATE ENCODING AND PATH DIVERSITY

FIELD OF THE INVENTION

The present invention relates generally to reliable multimedia communication across lossy packet networks, and more particularly, to a video communication method and system employing multiple state encoding and path diversity.

BACKGROUND OF THE INVENTION

It has been said, "A picture is worth a thousand words." Regarding video, it has been said, "A video is worth a thousand pictures." While text, graphics, and animation provide for interesting content, people naturally prefer to the richer and more realistic experience of video. One reason for the popularity of video is that the sights and sounds of multimedia (e.g., video combined with audio) provide a richer and more realistic experience that people have come to expect from years of watching moving pictures in the realm of television and movies.

As many applications and media migrate to the "digital" realm, video too is making this transition. From its early beginnings, video has been presented in the familiar analog videotape format. However, video is not becoming increasingly delivered in a digital format, such as CD-ROM, DVD-ROM, and computer networks (e.g., via the Internet).

Digital video in such systems is typically arranged as a series of video frames. The video frames usually occur at a high enough frame rate to enable a viewer to perceive full motion video when the video frames are rendered on a display.

Prior video communication systems commonly employ video compression to reduce the bandwidth consumption of the digital video. Typically, a sender includes an encoder that generates a series of encoded frames in response to a series of original video frames. Each receiver usually includes a decoder that re-constructs the original series of video frames from the encoded frames. The total amount of data contained in the encoded frames is usually significantly less than the total amount of data in the corresponding original video frames.

The encoded frames in prior video compression methods typically include frames that carry all of the information needed to reconstruct the corresponding original video frame. These frames are referred to as intra frames or "I-frames". Also, the encoded frames in prior video compression methods typically include frames that depend on prior encoded frame from the series of encoded frames to reconstruct the corresponding original video frame. These frames are referred to as predicted frames or "P-frames" since an encoder commonly generates these frames by employing a prediction loop.

Typically, the amount of data carried by an I-frame is significantly greater than the amount of data carried in a P-frame. Thus, to reduce the required bit rate, a greater percentage of the encoded frames are P-frames. Unfortunately, when using prediction, the loss of a P-frame or I-frame during transmission typically prevents the reconstruction of the current original video frame as well as the reconstruction of a sequence of sub-sequent P-frames before a next I-frame. The loss of a sequence of frames usually has negative effects on the reconstructed digital video. For example, these negative effects include freeze frame or the appearance of displayed artifacts. These negative effects are aggravated in systems that use a large number of P-frames between I-frames in order to conserve bandwidth or due to bandwidth constraints of the communication channel.

There are generally three types of packet loss: 1) single-packet loss, 2) burst loss, and 3) outage. A single packet loss, as the name implies, corresponds to a portion of one frame being lost. In such cases, the video data may be partially recoverable. A burst-loss corresponds to one or a number of frames being lost, which may lead to significant video degradation. Outage results in a number of frames being lost, which typically results in a total loss of the video. In such cases, the system cannot recover without an I-frame for re-synchronization.

It is noted that the loss of a number of consecutive packets has a much more detrimental effect than the loss of an equivalent number of isolated single packets. Consequently, it is of particular concern to reduce and/or eliminate burst losses and outages for video communication (e.g., a streaming video application).

For compressed video applications, the contents of each packet are dependent on the contents of other packets (e.g., previous packets) to re-construct the video. The loss of a single packet affects the use of other correctly received packets, and the propagation effect that results from the loss can be very substantial. The effect of packet loss depends on the type of loss and the particular application.

Because video has significant spatial and temporal correlations, the loss of a single packet may be concealed through the use of sophisticated error concealment techniques. However, if a number of packets are lost then the effect is much more detrimental.

Conventional approaches to overcome packet loss typically utilize re-transmission and forward error correction (FEC) techniques. Each of these techniques and their disadvantages or shortcomings are described hereinafter.

Re-transmission-based approaches use a back-channel to enable the receiver to communicate to the sender which packets are correctly received and which packets are not correctly received. As can be appreciated, the re-transmission-based approaches incur a delay corresponding to the round-trip-time (RTT) (i.e., the time needed to send information from the receiver to the sender and back to the receiver). In some applications, such as an electronic mail application, this delay may be acceptable.

However, in some applications, a back-channel may be unavailable. In other applications, a back-channel may be available, however there may be an inability to use re-transmissions. Examples of these applications include broadcast or multicast video.

Also, for other applications, this RTT delay may not be acceptable. For example, the information to be communicated may have a delay constraint (i.e., the information to be communicated has a time-bounded usefulness). In these applications, information that is not delivered in a timely manner is useless to the application. For example, a video frame or audio packet that arrives late at the receiver in these applications cannot be used. Examples of these applications include real-time video communications, such as real-time video telephone and video conferencing applications. Another example is one-way video, such as video games, where the video and audio information has delay constraints.

Consequently, the development of a system to enable reliable real-time multimedia communication over packet networks, such as the Internet, remains largely an unsolved problem. One of the main difficulties is that real-time multimedia communication over the Internet is hampered by packet loss described previously. Accordingly, current systems are limited to non-real-time or buffered communication, such as the type of service delivered by Real Networks.

In summary, there are applications where either a backchannel is not available or when the RTT delay is not acceptable. In these applications, a re-transmission based approach is an unsatisfactory solution.

In a second approach, forward error correction (FEC) techniques are utilized. FEC-based approaches add specialized redundancy (e.g., block and convolutional codes) to the data to overcome losses. FEC approaches also often interleave the data to convert burst errors into isolated errors. Unfortunately, the added redundancy requires increased bandwidth to implement. Furthermore, the FEC-based approaches are designed to overcome a predetermined amount of channel losses. If the losses are less than the predetermined amount, then the transmitted data can be recovered from the received lossy data. However, if the losses are greater than the predetermined amount, then the lost data can not be recovered, and furthermore, in certain cases all the data can be completely lost.

Another difficulty encountered in designing FEC-based systems is that network conditions, such as packet loss are highly dynamic, and there is typically limited knowledge about the current network conditions. In fact, the time scale for changes in network conditions is often shorter than the time needed to measure such changes, thereby making accurate determination of current network conditions difficult if not impossible. Consequently, the lack of knowledge about the instantaneous channel conditions typically leads to inefficient FEC design. Specifically, if the conditions in the channel in reality are better than that designed for, then resources are being wasted since more redundancy than necessary has bee used. On the other hand, if the channel conditions in reality are worse than that designed for, then all the data may be lost since not enough redundancy is employed. Because of the highly dynamic nature of many networks, in most cases the FEC is either over-designed and therefore inefficient or under-designed and therefore ineffective.

Based on the foregoing, there remains a need for a method and system to provide reliable communication between a sender and a receiver across a lossy network that overcomes the disadvantages set forth previously.

SUMMARY OF THE INVENTION

Video communication over lossy packet networks such as the Internet is hampered by limited bandwidth and packet loss. The present invention provides a system for providing reliable video communication over these networks, where the system is composed of two jointly designed subsystems: (1) multiple state video coding system and (2) path diversity transmission system. Multiple state video coding combats the problem of error propagation that results from packet loss by coding the video into multiple independently decodable streams, each with its own prediction process and state. If one stream is lost the other streams can still be decoded to produce usable video, and furthermore, the correctly received streams provide bi-directional (i.e., previous and future) information that enables improved state recovery for the corrupted stream.

The path diversity transmission system explicitly sends different subsets of packets over different paths, as opposed to the prior art approaches where the packets proceed along a single path. By explicitly sending different subsets of packets over different paths, the path diversity transmission system enables the end-to-end video application to effectively see an average path behavior, which is referred to herein as path diversity. Generally, seeing this average path behavior provides better performance than seeing the behavior of any individual random path. The resulting path diversity provides the multiple state video decoder with an appropriate virtual channel to assist in recovering from lost packets, and can also simplify system design (e.g., forward error correction design).

According to one embodiment of the present invention, a reliable video communication system is disclosed that employs multiple state encoding and path diversity to communicate digital video over a lossy network. First, a multimedia stream (e.g., a series of original video frames) is received. Second, the multimedia stream (e.g., series of original video frames) is separated into at least a first sub-stream and a second sub-stream (e.g., separated into odd video frames and even video frames). The first sub-stream and the second sub-stream are then encoded into two independently decodable streams. The first encoded sub-stream is sent to a receiver over a first path. The second encoded sub-stream is sent to a receiver over a second path.

In an alternative embodiment, the following processing steps are performed. First, a multimedia stream (e.g., a series of original video frames) is received. Second, the multimedia stream (e.g., series of original video frames) is encoded into an encoded stream (e.g., a series of encoded video frames where the odd and even frames are combined in the stream). Next, the encoded stream in separated into at least a first encoded sub-stream and a second encoded sub-stream (e.g., separated into encoded odd video frames and encoded even video frames). The first encoded sub-stream and a second encoded sub-stream are two independently decodable streams. The first encoded sub-stream is sent to a receiver over a first path. The second encoded sub-stream is sent to a receiver over a second path.

Other features and advantages of the present invention will be apparent from the detailed description that follows.

BRIEF DESCRIPTION OF THE DRAWINGS

The present invention is illustrated by way of example, and not by way of limitation, in the figures of the accompanying drawings and in which like reference numerals refer to similar elements.

FIGS. 12A and 12B illustrate state recovery for a video communication system during balanced operation and unbalanced operation, respectively, in accordance with one embodiment of the present invention.

DETAILED DESCRIPTION OF THE PREFERRED EMBODIMENT

A method and system for reliably communicating information from a sender to a receiver through a lossy network are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Video Communication System 100

Figure 1:
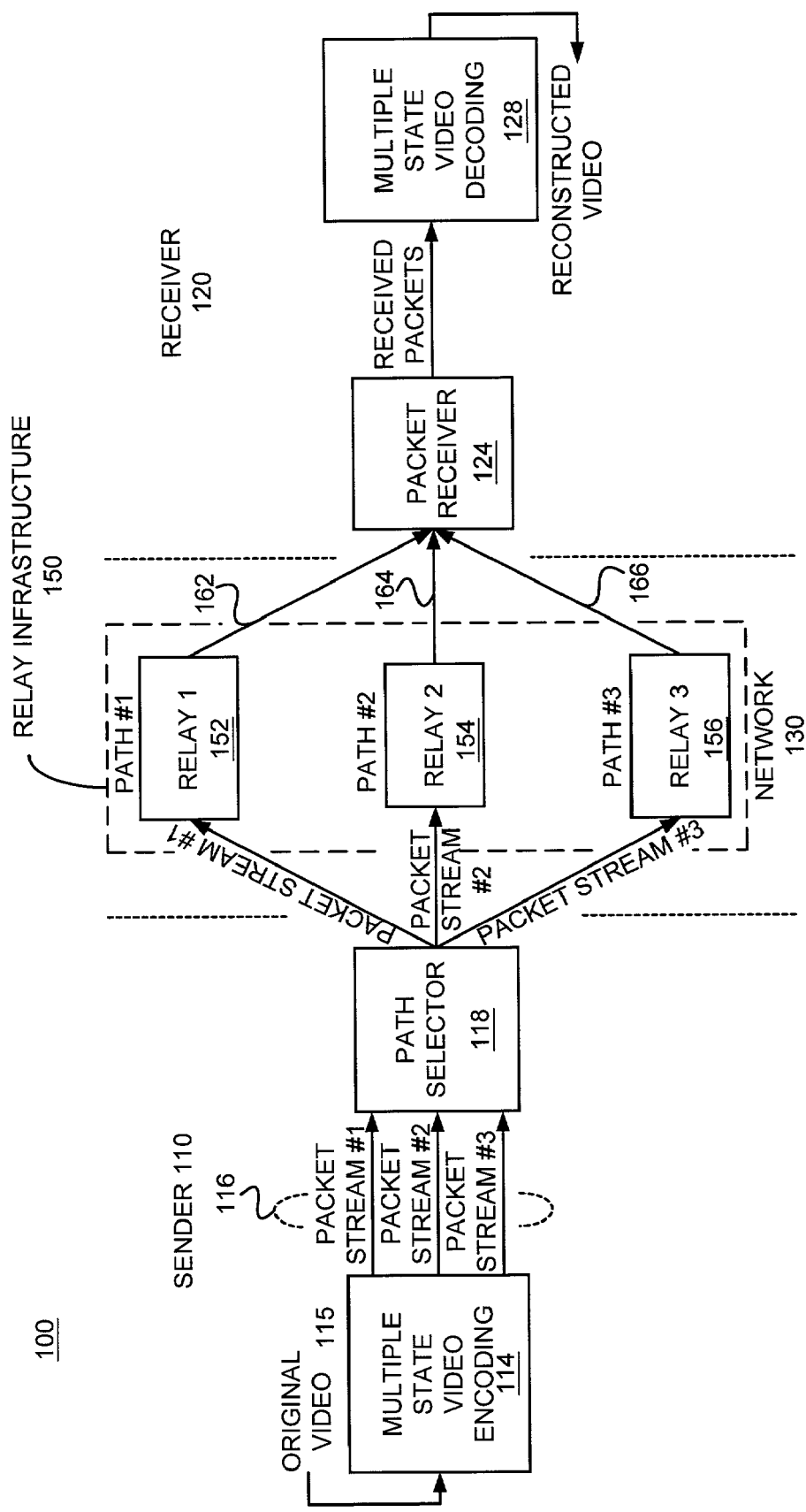
FIG. 1 illustrates a video communication system according to one embodiment of the present invention.

FIG. 1 illustrates a video communication system 100 according to one embodiment of the present invention. The video communication system 100 includes a sender 110 for sending a packet communication, a receiver 120 for receiving the packet communication, and a packet network 130 through which the information is communicated. The video communication system 100 can, for example, be utilized to reliably communicate compressed video over a lossy packet network, such as the Internet. The system 100 can be utilized to support a real-time video telephone application or a video conferencing application that communicate real-time video information and audio information. For example, the video communication system 100 can perform one or more of the following operations on a stream of video in real-time: capture, encode, transmit, receive, decode, recover from losses, and display.

The sender 110 includes a multiple state video encoder 114 for generating at least two independently decodable packet streams in response to an original video stream and a path selector 118 for explicitly sending each packet stream over a different path through the network 130.

The multiple state video encoder 114 receives original video 115 and encodes the video 115 in this example into three independently decodable packet streams 116 by employing multiple state encoding with three states. It is noted that the multiple state video encoder 114 can generate any number of independently decodable packet streams to suit a particular application.

In one embodiment, the network 130 includes a relay infrastructure 150 that has a plurality of network devices (e.g., relays) for use in achieving path diversity. In this embodiment, the relay infrastructure 150 includes a first relay 152, a second relay 154, a third relay 156, that correspond to a first path, 162, a second path 164, a third path 166, respectively. When each relay receives a corresponding packet stream, the relay forwards the packet stream to the final destination (i.e., the receiver 120).

The path selector 118 can explicitly send each packet stream over a different path through the network 130 by utilizing a different relay in the relay infrastructure 150. Specifically, the path selector 118 can use one or more relays in the infrastructure 150 to define or specify each path (e.g., paths 162, 164, 166). In this example, there are three paths that are each defined by a single relay. However, it is noted that the number of paths and the number of relays employed to define each path can be varied to suit the requirements of a particular application.

Path diversity can also be realized by utilizing IP source routing. In this case, the path selector 118 is configured to explicitly specify the set of nodes or the source route for each packet stream to traverse. For example, the path selector 118 can employ loose source routing that specifies a subset of the nodes of the source route or strict source routing that specifies the complete set of nodes of the source route.

The receiver 120 includes a packet receiver 124 for combining the multiple streams into a single stream and a video decoder 128 for reconstructing the original video frame in response to received encoded video frames.

It is noted that the system 100 can include a feedback link (e.g., a feedback channel) that can be utilized by the receiver 120 to send information about the quality of each of the paths to the sender 110. The feedback link and the path quality parameters are described in greater detail hereinafter with reference to FIG. 11.

Figure 2:
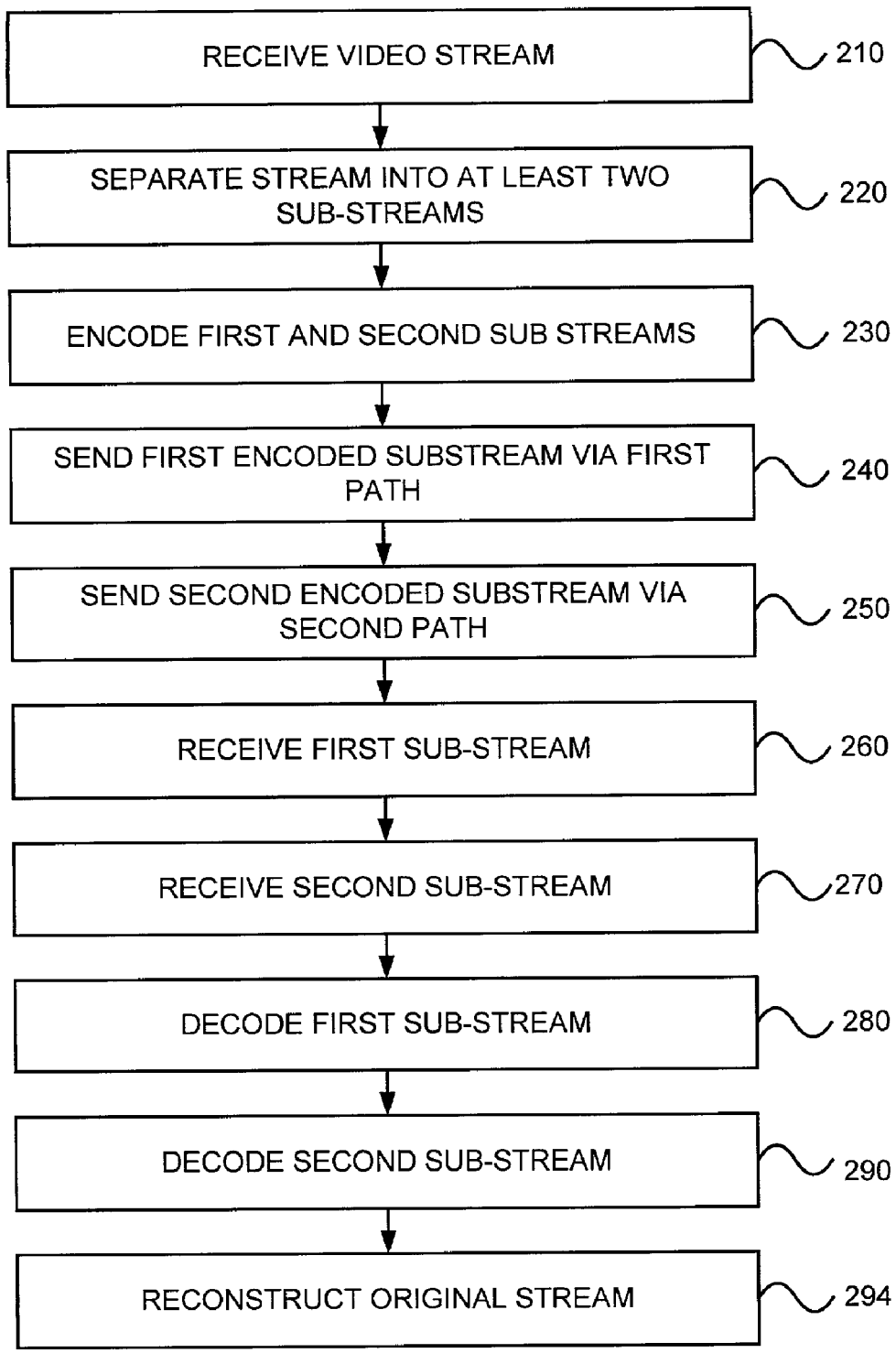
FIG. 2 a flowchart illustrating the steps performed by the video communication system in accordance with one embodiment of the present invention.

FIG. 2 a flowchart illustrating the steps performed by the video communication system in accordance with one embodiment of the present invention. The method of communicating information from a sender to a receiver over a network can include the following steps. First, in step 210 a video stream to be communicated is received all at once, or one frame at a time (e.g., in real-time). In step 220, the video stream is separated or partitioned into at least a first subset and a second subset of information. The first and second subsets are not necessarily disjoint. In step 230, the first subset and the second subset of video is coded into a first subset of packets and the second subset into a second subset of packets in a manner such that each subset of packets is independently decodable. In step 240, the first subset of packets is sent via a first path over the network to the receiver. In step 250, the second subset of packets is sent via a second path over the network to the receiver.

In step 260, the first subset of packets is received. In step 270, the second subset of packets received. In step 280, the first subset of packets is decoded to generate a reconstructed first subset of packets. In step 290 the second subset of packets is decoded to generate a reconstructed second subset of packets. In step 294, the reconstructed first subset of packets and the reconstructed second subset of packets are merged to recover the original stream of packets (e.g., video frames).

Figure 8:
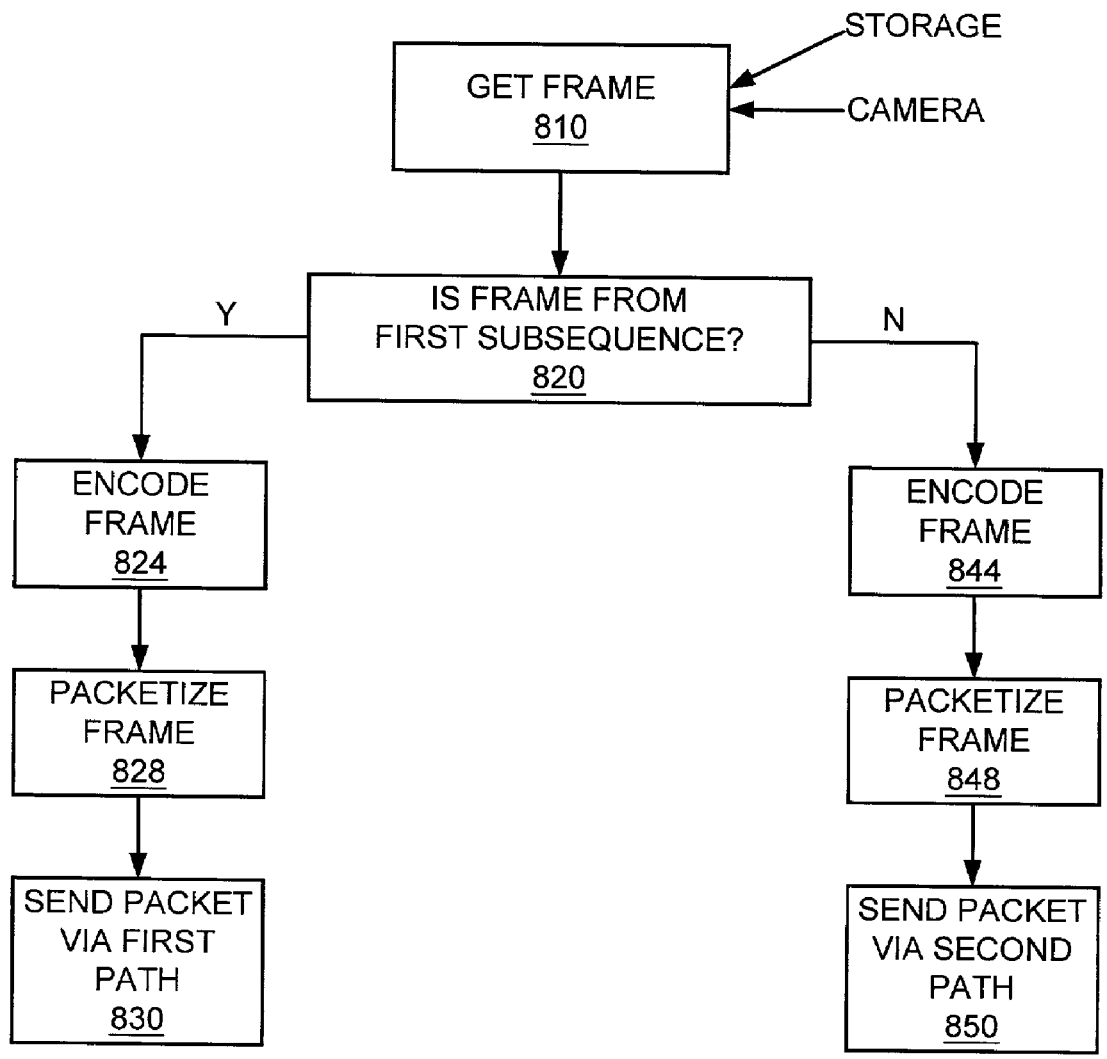
FIG. 8 a flowchart illustrating the steps performed by the multiple state video encoder in accordance with one embodiment of the present invention.

FIG. 8 a flowchart illustrating the steps performed by the multiple state video encoder in accordance with one embodiment of the present invention. In step 810, a frame is obtained. For example, the frame can be provided by a video capture device or a video storage facility. In step 820, a determination is made whether the frame is from a first sub-sequence. In this example, an original information stream is utilized to generate two streams (i.e., a first sub-sequence and a second sub-sequence). It is noted that the first sub-sequence can include a portion of the original frames, all the original frames, or none of the original frames. Similarly, the second sub-sequence can include a portion of the original frames, all the original frames, or none of the original frames. For example, in a video transmission context, a first stream of odd video frames and a second stream of even video frames can be generated in response to the original information stream.

When it is determined that the frame is from the first subsequence, the frame is encoded (step 824), packetized (step 828), and sent via a first path (step 830). When it is determined that the frame is not from the first subsequence, the frame is encoded (step 844), packetized (step 848), and sent via a second path (step 850).

Figure 9:
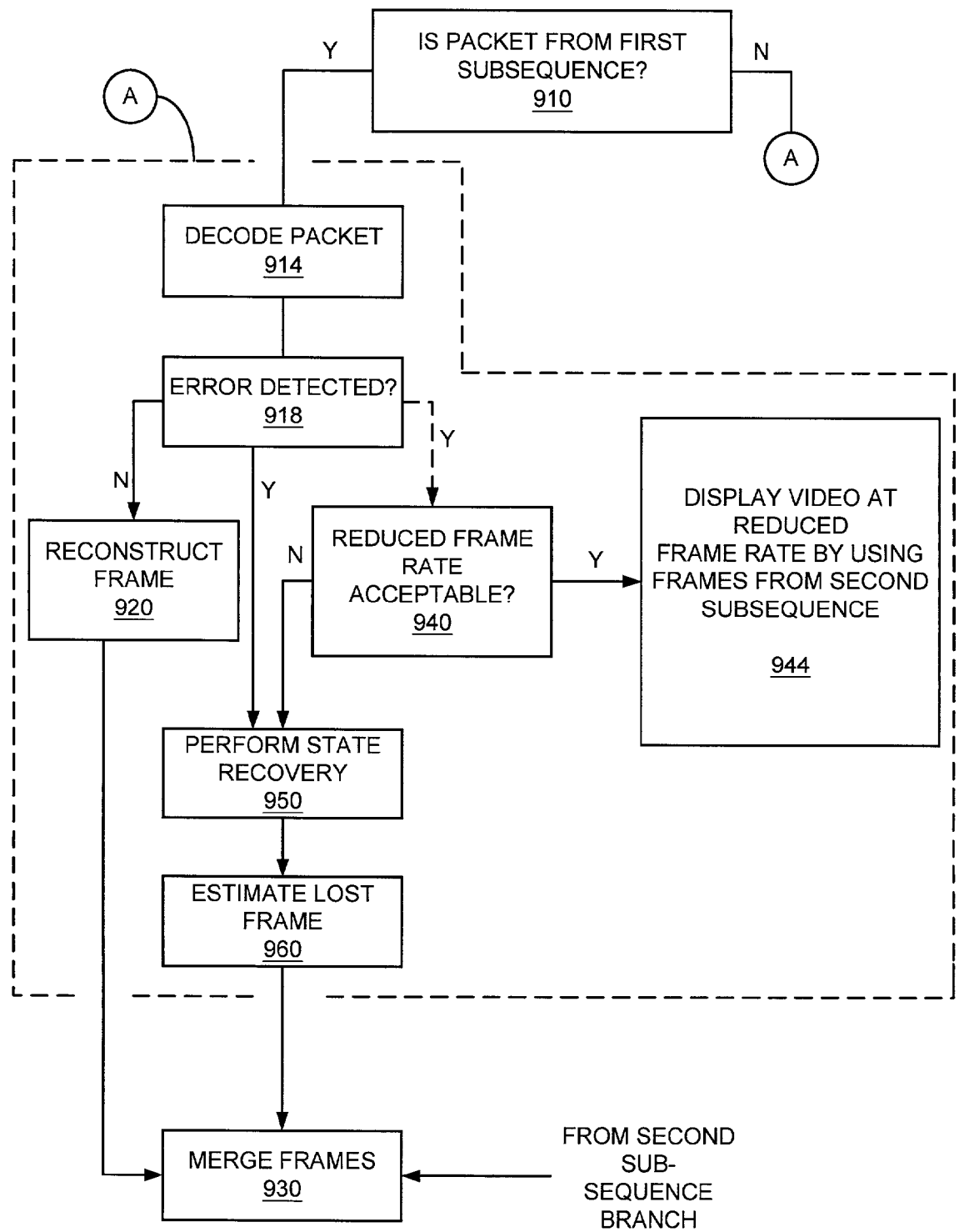
FIG. 9 a flowchart illustrating the steps performed by multiple state decoder in accordance with one embodiment of the present invention.

FIG. 9 a flowchart illustrating the steps performed by multiple state decoder in accordance with one embodiment of the present invention. In step 910, a determination is made whether the received frame is from a first sub-sequence. If so, the packet is decoded in step 914. In step 918, a determination is made whether an error has been detected. If there is no error, the frame is reconstructed (step 920) and merged with other frames (step 930). For example, the decoded odd frames can be merged with the decoded even frames.

When an error has been detected, state recovery is performed by employing previous or future frames of correctly decoded frames (step 950). In step 960, the lost frame is estimated. Processing then proceeds to step 930. Optionally, when an error has been detected, steps 940 and 944 may be processed before the state recovery 950. In step 940, a determination is made whether a reduced frame rate is acceptable (e.g., recovering the video stream at one-half the frame rate). If so, in step 944, the video is displayed at the reduced frame rate by using frames from on of the other sub-sequences (e.g., the second sub-sequence). Steps 914 to 960 may be replicated for the processing of each subsequence of frames. For example, a packet from the second sub-sequence has a similar processing flow except that in step 944, the reduced frame rate is generated by using the frames from the first subsequence or another sub-sequence that is received without error, and in step 930, the second subsequence of frames is merged with other subsequences (e.g., frames in the first sub-sequence).

Figure 3:
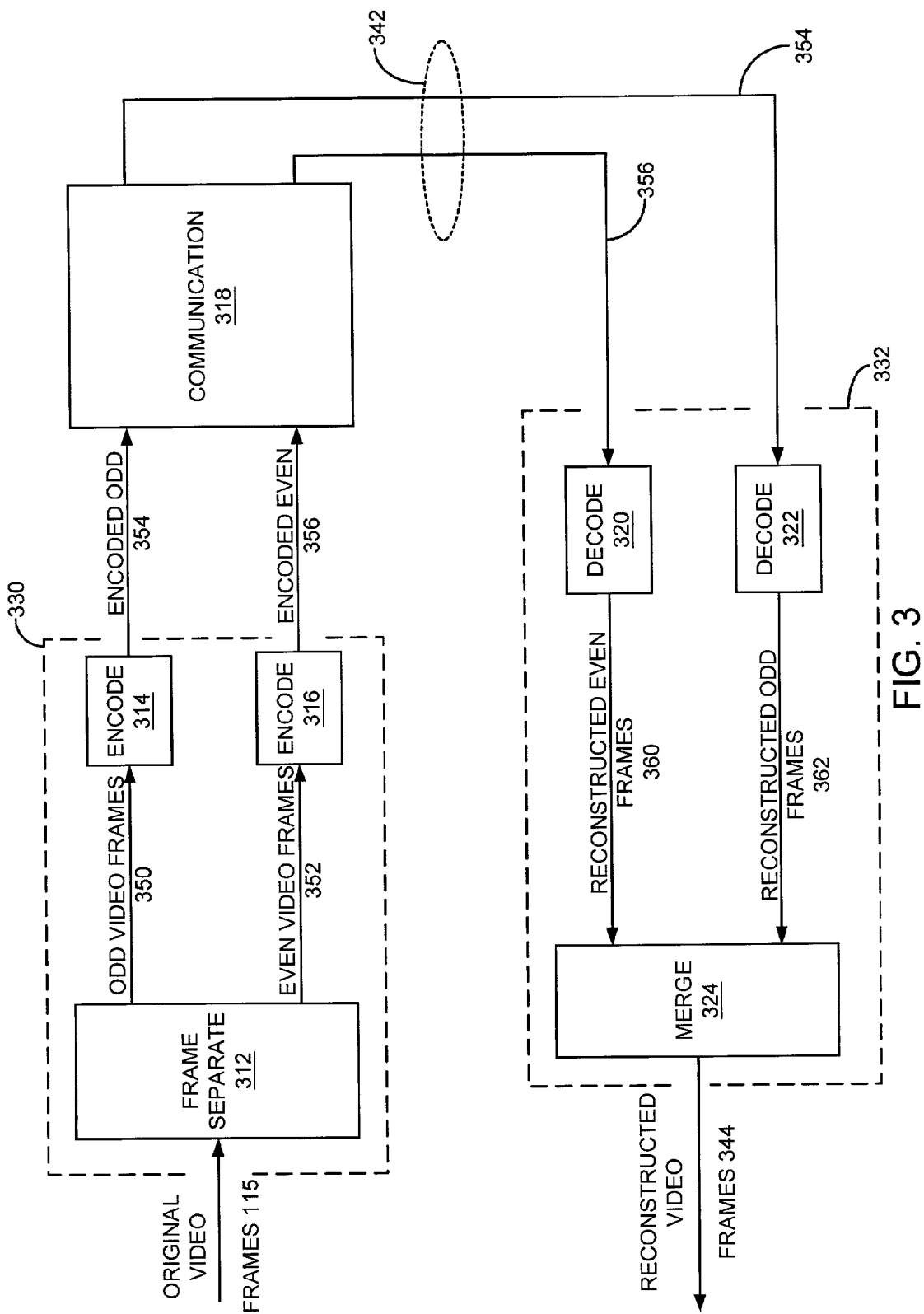
FIG. 3 illustrates in greater detail the video communication system of FIG. 1 in accordance with one embodiment of the present invention.

FIG. 3 illustrates in greater detail the video encoder and transmitter block of FIG. 1 in accordance with one embodiment of the present invention. In this embodiment, the multiple state video encoder 114 includes a frame separate block 312 that separates the original video frames 115 into, for example, a series of odd video frames 350 and a series of even video frames 352. For example, if the original video frames 115 are a series of $frame_1$, $frame_2$, $frame_3$, $frame_4$, $frame_5$, $frame_6$, $frame_7$, $frame_8$, etc., then the odd video frames 350 are $frame_1$, $frame_3$, $frame_5$, $frame_7$, etc., and the even video frames 352 are a series of $frame_2$, $frame_4$, $frame_6$, $frame_8$, etc. In some embodiments, the frame separate block 312 performs pre-processing such as temporal low-pass filtering or noise reduction before extracting the frames for each stream.

It is noted that there are a number of different ways in which the original video can be separated into two or more parts for separate encoding. In the above example, the original video is separated into even and odd frames. However the invention applies to other possible separations as is subsequently discussed.

The multiple state video encoder 114 includes an encode block 314 that generates the encoded odd frames 354 in response to the odd video frames 350. The encoded odd frames 354 include I-frames and P-frames. In response to the example series $frame_1$, $frame_3$, $frame_5$, etc., the encode block 314 may generate an I-frame $I_1$, followed by P-frames $P_3$, $P_5$, etc. $P_3$ depends on $I_1$; $P_5$ depends on $P_3$, etc.

Similarly, the multiple state video encoder 114 includes an encode block 316 that generates the encoded even frames 356 in response to the even video frames 352. In response to the example series $frame_2$, $frame_4$, $frame_6$, etc., the encode block 316 may generate an I-frame $I_2$ followed by P-frames $P_4$, $P_6$, etc. $P_4$ depends on $I_2$, $P_6$ depends on $P_4$, etc.

Alternatively, in response to the exemplary series $frame_1$, $frame_3$, $frame_5$, etc., the encode block 314 may generate $I_1$, followed by P-frames $P_3$, $P_5$, etc., and in response to the exemplary series $frame_2$, $frame_4$, $frame_6$, etc., the encode block 316 may generate P-frames $P_2$, $P_4$, $P_6$, etc., where $P_3$ depends on $I_1$, and $P_5$ depends on $P_3$, etc., and where $P_2$ depends on $I_1$, and $P_4$ depends on $P_2$, and $P_6$ depends on $P_4$ etc.

In another alternative, the I-frames in the encoded odd and even frames 350 and 352 may be offset with respect to one another. For example the encode block 314 may generate $I_1$, followed by P-frames $P_3$, $P_5$, etc., and the encode block 316 may generate P-frames $P_2$, $P_4$, $P_6$, $I_8$, $P_{10}$, $P_{12}$, etc., where $P_3$ depends on $I_1$, and $P_5$ depends on $P_3$, etc., and where $P_2$ depends on $I_1$, and $P_4$ depends on $P_2$, and $P_6$ depends on $P_4$, and $P_{10}$ depends on $I_8$ etc. In such an alternative, it may be preferable that the I-frames in the encoded even frames 356 are evenly spaced between the I-frames in the encoded odd frames 354 and visa versa.

The communication block 318 carries the streams of encoded odd and event frames 354 and 356 to the receiver 332. It is preferable that the streams of encoded odd and even frames 354 and 356 be carried in separate channels or communication paths so that disruptions that cause errors in the transmission of one of the streams do not hinder the transmission of the other. For example, if the communication block 318 is implemented as a packetized communication network, then the stream of encoded odd frames 354 should be sent in packets that are separate from the packets that carry the stream of encoded event frames 356. As another example, if the communication block 318 is implemented as a radio frequency network then the stream of encoded odd frames 354 should be transmitted in a frequency band that is different from the frequency band that carries the stream of encoded event frames 356.

The receiver 332 includes a decode block 320 that generates a series of reconstructed even video frames 360 in response to the encoded even frames 356. The receiver also includes a decode block 322 that generates a series of reconstructed odd video frames 362 in response to the encoded odd frames 354. The decoding method implemented in the decode block 320 is adapted to the encoding method in the encode block 314. Similarly, the decoding method implemented in the decode block 322 is adapted to the encoding method in the encode block 316.

For example, if the encode block 316 generates P-frames in the encoded even frames 356 that carry motion estimation and error information according to a prediction loop, then the decode block 320 uses the motion estimation and error information from the received P-frames in its own prediction loop to generate the reconstructed even video frames 360.

In such embodiments, the prediction loops in the encode blocks 314 and 316 and the decode blocks 320 and 322 continually update their states with each encoded frame generated or received. For example, the prediction loop in the encode block 314 updates its state of each encoded odd frames 354 it generates and the decode block 320 updates its state after decoding the odd frames 354. Each prediction loop contains information, which may be referred to as its state. The state of a prediction loop is used to form the prediction of the current frame to be encoded. One component of the state is the previous coded frame. The state varies with each encoded frame.

Each encode block 314 and 316 has a prediction loop with its own state. Each encode block forms a prediction based on its state and codes and transmits the error signal along with side information such as motion vectors and inter/intra decisions for each block. This information describes how to form a prediction from the state. Each decode block 320 and 324 forms a prediction based on its state and the side information and then adds the received decoded error signal to reconstruct the current frame. The encode/decode block pairs should have the same state. Otherwise their predictions will differ and they will lose tracking and may produce significant visual degradation in the reconstructed video frames 344.

Prior video compression methods usually have a single prediction loop at the sender and the receiver with a single state or other information which if lost results in different predictions in the sender and receiver, thereby often leading to significant visual degradation. The techniques of the present invention use multiple prediction loops, where each prediction loop has its own state information. Consequently, the present invention provides video communication that uses multiple states.

The receiver 332 includes a merge block 324 that combines the reconstructed even and odd video frames 360 and 362 into a series of reconstructed video frames 344 in the proper frame order. For example, the merge block 324 combines the reconstructed odd video frames 362 that include the reconstructed full frames $frame_1$, $frame_3$, $frame_5$, etc. with the reconstructed even video frames 360 that include the reconstructed full frames $frame_2$, $frame_4$, $frame_6$, etc. to provided the reconstructed video frames 344 that include the full frames $frame_1$, $frame_2$, $frame_3$, $frame_4$, $frame_5$, $frame_6$, etc. The reconstructed video frames 344 may be provided to a real-time display (not shown).

The merge block 324 may also perform post-processing such as known processing for artifact reduction or temporal filtering across the streams to reduce distortions in each stream and/or produce uniform quality across the streams or temporal frame-rate conversion.

The multiple state video encoder may be replaced by a multiple description video coder. Specifically, a multiple description video coder is a coder, which codes the original video into a number of streams, where each stream is independently decodable from the other streams. Each stream can then be sent over a different path using the path diversity transmission system.

The multiple state video encoder may be replaced by a multiple description audio or speech coder. Specifically, a multiple description audio or speech coder is a coder, which codes the original video into a number of streams, where each stream is independently decodable from the other streams. Each stream can then be sent over a different path using the path diversity transmission system.

The multiple state video encoder may be replaced by a conventional video or audio encoder. The conventional video or audio encoder combined with the proposed path diversity system would still provide improved performance over a conventional video or audio encoder and a conventional transmission system employing a single path.

Figure 4:
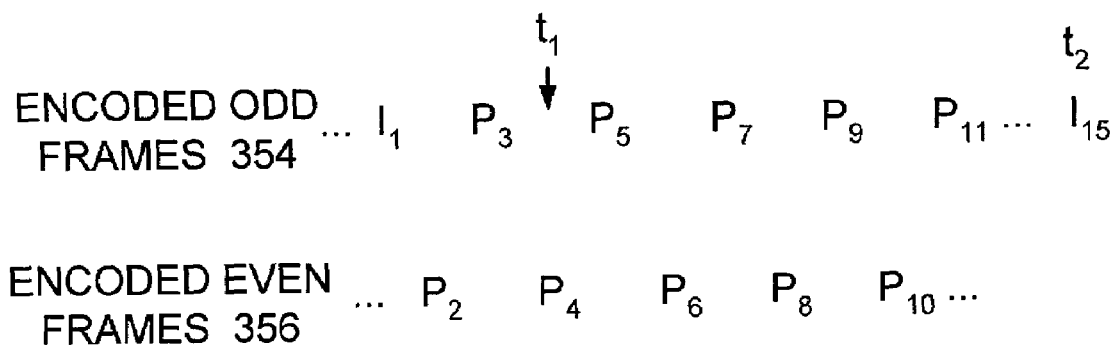
FIG. 4 illustrates advantages yielded by separate streams when an error occurs in the transmission of one of the streams.

FIG. 4 illustrates the advantages yielded by the separate streams 354 and 356 when an error occurs during the transmission between the sender 330 and the receiver 332. In this example, where $P_3$ depends on $I_1$, and $P_5$ depends on $P_3$, etc., and where $P_2$ depends on $I_1$, and $P_4$ depends on $P_2$, and $P_6$ depends on $P_4$, etc.

At time $t_1$, an error that occurs in the transmission of the encoded odd frames 354 prevents the decode block 322 from properly reconstructing $P_5$. In terms of a prediction loop, the decode block 322 cannot accurately decode frame $P_5$ and therefore has an incorrect state as compared to the encode block 314. As a consequence, the decode block 322 cannot reconstruct $P_5$ through $P_{13}$ which are successively dependent on one another. The state for the decode block 322 is not re-initialized, in this example, until the I-frame $I_{15}$ is received at time $t_2$.

Between times $t_1$ and $t_2$, the decode block 320 continues to update its state with information carried by $P_4$, $P_6$, $P_8$, etc. and is unaffected by the loss of $P_5$. As a consequence, the reconstructed video frames 344 carry the reconstructed event video frames 360 between times $t_1$ and $t_2$. This provides a display at one half the normal frame rate of the original video frames 340. This provides a better video image than prior systems that would freeze the video or that would perform error concealment between times $t_1$ and $t_2$.

In an embodiment having three separate streams, a loss of an I-frame or a P-frame in one of the streams yields a frame rate of two-thirds the normal rate. An embodiment having four separate streams yields a frame rate of three-fourths the normal rate upon a loss of a P-frame in one of the streams, etc.

The motion estimation parameters and error information parameters may be defined in a video compression standard. Examples of these standards are numerous and include the various motion picture experts group (MPEG) standards such as MPEG-1, MPEG-2, MPEG-4, as well as H.261 and H.263.

Conventional channel coding techniques, such as Forward Error Correction Coding (FEC) or interleaving of data or packets, can be applied to the packets in each individual path or to packets across a number of paths. For example, FEC can be applied to the packets in an individual path to generate redundant packets (e.g. parity packets), which are sent over that same path. Alternatively, FEC can be applied to packets across a number of paths. For example, FEC can be applied to one packet from path 1, one packet from path 2, . . . , one packet from path N, to create a redundant packet (e.g. parity packet) to be transmitted in path N+1.

Decoder Portion of System

One aspect of the present invention relates to the use of state recovery at the decoder to estimate any lost information (e.g. from packet loss) from the correctly received information. Specifically, the use of path diversity enhances the ability of the decoder to perform state recovery and thereby recover the lost information. For example, when one frame (or a portion of a frame) is lost via packet loss, the decoder architecture of the present invention can often accurately estimate (i.e., recover) the lost information by using the correctly received surrounding frames.

Figure 5:
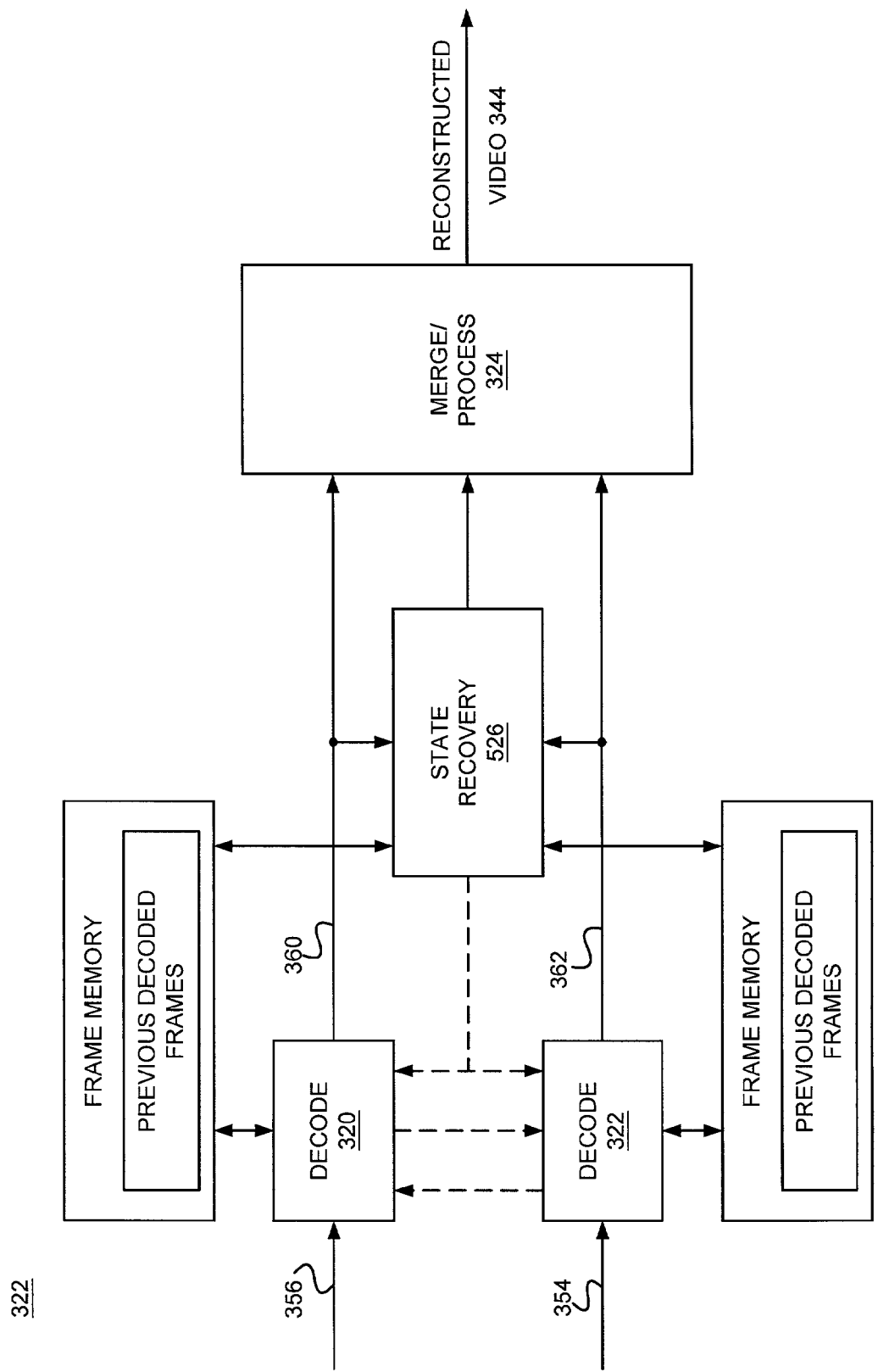
FIG. 5 illustrates in greater detail the video receiver and decoder block of FIG. 1 in accordance with one embodiment of the present invention.

FIG. 5 illustrates in greater detail the video receiver and decoder block of FIG. 1 in accordance with one embodiment of the present invention. The receiver 332 includes a state recovery block 526 for recovering the lost P-frame P5 of the stream 354 using the information provided by the stream 356. The recovery of P5 enables the decode block 322 to continue with its prediction loop by correctly updating its state information and reconstruct P7 through P13. The fact that the reconstruction of the stream 356 is unaffected by the loss of P5 enables the state recovery block 526 to use past and future frames with respect to the lost frame P5 to recover frame P5.

The past frames P2 and P4 and the future frames P6 through P14 are available to the state recovery block 526 as well as P1 and P3 from the odd stream 354. Any accurately decoded frame from any of the streams 354, 356 may be used by the state recovery block 526. For example, all previous even and odd frames in the streams 354 and 356 as well as future even frames in the stream 356 can be utilized.

For example, the state recovery block 526 may recover the full frame version of P5 by averaging frame4 and frame6, which are the reconstructed full frame versions of P4 and P6. The reconstructed full frames frame4 and frame6 are generated by the decode block 320 as part of the reconstructed event video frames 360. The state recovery block 526 may average any combination of the reconstructed versions of P2, P4 through P14 as well as P1 and P3. Such averaging may be appropriate when the video image carried in the streams 342 is static or slowly moving.

Alternatively, the state recovery block 526 may recover the full frame version of P5 by interpolating or estimating the full frame version of P5 by employing any combination of the reconstructed full frame versions of P2, P4, and P6 through P14 as well as P1 and P3. Numerous motion estimation methods may be used to estimate the motion between the frames including block-based methods, constraint equation methods, pel-recursive methods, phase-correlation methods, Bayesian methods, and object-based methods.

The full frame version of P5 may be estimated by performing motion-compensated interpolation using motion estimates and by applying appropriate linear or nonlinear filtering along the motion trajectories. The interpolation may also account for covered and uncovered areas within the frame by appropriately choosing to use only future or previous frames to estimate the appropriate areas.

In another alternative embodiment, the state recovery block 526 may recover the full frame version of P5 by interpolating or estimating the full frames version of P5 using the motion vectors contained in any combination of the P-frames P2, P4, and P6 through P14 as well as P1 and P3. In addition, other coded information from these past and future I-frames and P-frames may be used. The use of coded information in the bit-stream may help to reduce the complexity of state recovery in the receiver 332.

The streams 354 and 356 may be coded in a coordinated manner so that if one is lost that coded information in the other is useful for recovering the lost sequence. For example, motion vectors for the stream 354 may be computed while accounting for the stream 356 so that if the stream 356 is lost, the motion vectors from the stream 354 may be used to enable accurate recovery.

State recovery may be performed using any sub-set of correctly decoded frames. The lost frame may be estimated by replacing it by another correctly decoded frame, by replacing it by a motion-compensated version of a correctly decoded frame, or by replacing it via motion-compensated interpolation.

The encode blocks 314, 316 may send side information to the decode blocks 320, 322 for each frame in the streams 354, 356 that informs the state recovery block 526 how to perform state recovery if the corresponding frame is lost. Known error concealment methods may be applied using both previous and future frames to produce improved concealment of the lost frame.

In an embodiment in which the streams include bidirectionally predicted frames (B-frames), the state recovery block 526 may optionally recover and display lost B-frames. This is optional since no other frames depend on a lost B-frame.

Figure 6:
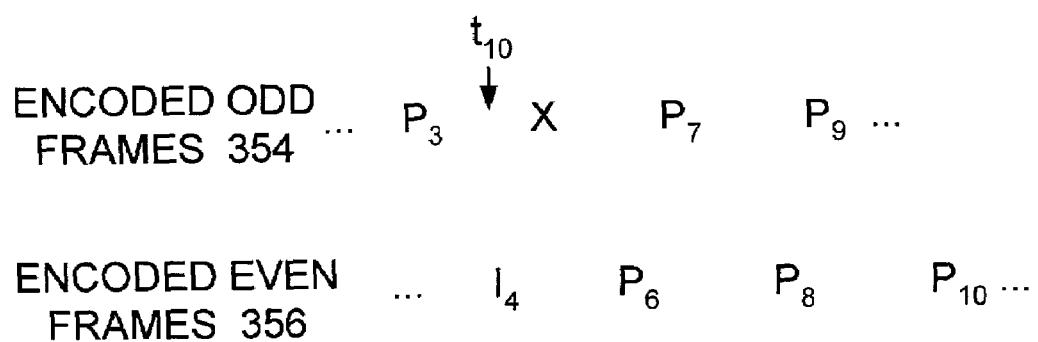
FIG. 6 illustrates an example in which past and future frames are selected for use in recovering a lost frame.

FIG. 6 illustrates an example in which past and future frames are selected for use in recovering a lost frame. The state recovery block 526 selects past and future frames to be used in recovering a lost frame while taking into account scene changes. In this example, a communication error at time t10 causes the loss of the encoded version of frame5 from the encoded odd frames 354. Since frame 3 is a P-frame and frame4 is an I-frame, it is concluded that a scene change may have occurred between frame3 and frame4 and that therefore the lost frame5 was coded by the encode block 314 as an I-frame to accommodate the scene change. The state recovery block 526 selects any combination of the reconstructed versions of I4, P6, P8, etc. to be used in the recovery of frame5, but not P2 or P3 because they are probably associated with a previous scene.

This method may also be used in instances where there is a P-frame for which most of its blocks are coded as I-blocks as opposed to P-blocks. For example, if P3 corresponds to a typical P-frame where most of its blocks are coded as P-blocks and frame4 is also a P-frame, but it has a significant percentage of it blocks codes as I-blocks, then this indicates that there is significant new imagery in the I-block parts of frame4 and that information, rather than corresponding areas of P3 should be used for recovering frame5. A P-frame may have I-blocks when those blocks cannot be accurately predicted from the previous frame, for example when there is significant motion in a part of frame or there is new imagery in part of the frame.

The above techniques can also be applied if only a portion of a frame is lost. In this case, the recovery can be based on both the surrounding frames, as well as, the correctly received portion of the current frame.

In some embodiments, a communication channel exists that enables the receiver 332 to transmit information back to the sender 330. Such a channel is often referred to as a back channel. In such embodiments, the state recovery block 526 uses the back channel to notify the sender 330 that an error caused the loss of frame5. The back channel may be used by the receiver 332 to inform the sender 330 as to the method used in state recovery.

While the state recovery block 526 recovers frame5 using selected past and future frames as described above, the sender 330 uses those same past and future frames and recovery method to determine the recovered frame5. The sender 30 then compares the recovered frame5 to the actual frame5 that was previously encoded and transmitted to determine the quality of recovery performed by the state recovery block 526.

If the quality of recovery is not sufficient then the sender 330 encodes and transmits an I-frame in the encoded odd frames 354 to reinitialize the state of the decode block 322. As an alternative to sending an entire I-frame, the sender 330 may determine which sub areas of the recovered frame5 are poor and send a frame that is intra for those areas and predictive for the remaining areas. The encoder may choose to replace its state with the recovered frame and then continue to code and form predictions in a known manner.

The blocks 312 to 324 each represent hardware and/or software elements for performing their particular functions. For example, the frame separate block 312 may be implemented with a hardware multiplexor circuit or may be implemented with equivalent functionality in software/firmware for a processor in the sender 330. The merge block 324 may be implemented with a hardware demultiplexor circuit or may be implemented with equivalent functionality in software/firmware for a processor in the receiver 332. The encode blocks 314, 316 may be implemented with separate hardware encoders, or with software/firmware for a processor in the sender 330, or with a combination thereof. The decode blocks 320, 322 may be implemented with separate hardware decoders, or with software/firmware for a processor in the receiver 332, or with a combination thereof. The functionality of the state recovery block 526 may be implemented in the hardware and/or software of the decode blocks 320, 322 or in separate hardware and or software/firmware.

The implementation of the communication block 318 includes hardware and or software/firmware elements that are adapted to the type of communication employed in the video communication system 100. For example, if the video communication system 100 uses Internet communication, then the communication block 318 includes the hardware elements in the sender 330 and the receiver 332 for Internet access, as well as, software elements for implementing Internet communication protocols in the sender 330 and the receiver 332.

In another example, if the if the video communication system 100 uses wireless communication, then the communication block 318 includes the hardware elements in the sender 330 and the receiver 332 for wireless transmission , as well as, software elements for implementing wireless communication protocols, such as cellular, in the sender 330 and the receiver 332.

In a manner similar to the encoder, the decoder may include two separate decoders or a single decoder that alternates which previous decoded frame it uses to perform the prediction. If there are no errors and both the even and odd streams are received correctly, then both streams are decoded to produce the even and odd frames, which are interleaved for final display.

If a stream has an error then the state for that stream is incorrect and there will be error propagation for that stream. However, the other independently decodable stream can still be accurately and straightforwardly decoded to produce usable video. For example, if the bitstream corresponding to the odd frames is lost, the even frames may still be decoded and displayed, recovering the video at half its original frame rate. The error produces a temporary reduction in the frame rate, however there are no other distortions. It is noted that a temporary reduction in the frame rate is often preferable to the case of prior art approaches that either freeze the video or attempt to estimate the unknown video by performing some form of concealment. Either of these prior art approaches can lead to significant distortion, especially if there are many frames before the next I-frame.

An important feature of multiple state video coding of the present invention is that it provides improved error concealment and enables improved state recovery of the corrupted stream. Prior art video coding approaches only have access to previous frames to use in error concealment. The state recovery technique of the present invention provides access to both previous and future frames, as illustrated in FIG. 6. Availability and careful usage of both previous and future frames greatly assists in recovering the corrupted stream, thereby restoring the video to its full frame rate. Specifically, the lost state (e.g., the coded frame) can often be estimated with sufficient accuracy to be used as a reference for predicting other frames in that stream. As a result, the corrupted stream may be recovered quickly by the present invention, which is preferable to waiting for the next re-synchronization.

In contrast to the conventional (single-state) video coding architecture, which provides access to only previous frames to perform the concealment (or state recovery), the proposed approach provides access to both previous and future frames, enabling improved state recovery.

Furthermore, the proposed approach provides the capability to estimate the quality of the recovery. For example, in a manner analogous to how the correctly received stream can be used to estimate the corrupted stream, the recovered corrupted stream can be used to estimate the known correctly received stream, and the accuracy of the match can provide an estimate of the recovery quality.

Knowledge of the quality of the error concealment may be beneficial in a variety of ways. For example, when the quality is unacceptable, the decoder may choose to simply freeze the last correctly decoded frame and wait for the next re-synchronization. When the quality is good, the decoder can continue to decode and display all the frames.

It is noted that in the prior art (single-state) video coding approach, it is typically very difficult for the decoder to estimate the quality of the resulting error concealment since the decoder has no knowledge of what the correct frames should be.

Multiple state video coding and path diversity are useful even if used separately. For example, multiple state video coding can provide improved reliability even when sent over a single path. In addition, it does not require a back-channel and therefore can be applied in a wide variety of applications (e.g. broadcast or multicast), and it has the attractive property that it can be applied as a standard-compatible enhancement within MPEG-4 Version 2 (with NEWPRED) and H.263 Version 2 (with RPS).

Consequently, any MPEG-4 Version 2 decoder can decode the resulting bitstream, while an enhanced decoder designed to perform state recovery configured as described herein can provide improved error recovery. Path diversity provides a number of benefits including (1) a reduced variability in communication quality as compared to an individual path, (2) burst packet losses are converted to isolated packet losses, and (3) the probability of an outage is greatly reduced. Therefore, path diversity may be beneficial for more general packet-based communication system design, as it provides an improved virtual channel and simplifies system design, e.g. FEC-design.

When used together, multiple state video coding and path diversity complement, and also to a certain extent, enhance each other's capabilities. Multiple state video coding provides multiple independently decodable bitstreams, which the transmission system explicitly sends over different paths, and the transmission system provides the video decoder with a high probability that at least one of the streams will be received correctly at any point in time, thereby enabling the video decoder to perform state recovery to recover a corrupted stream.

Figure 7:
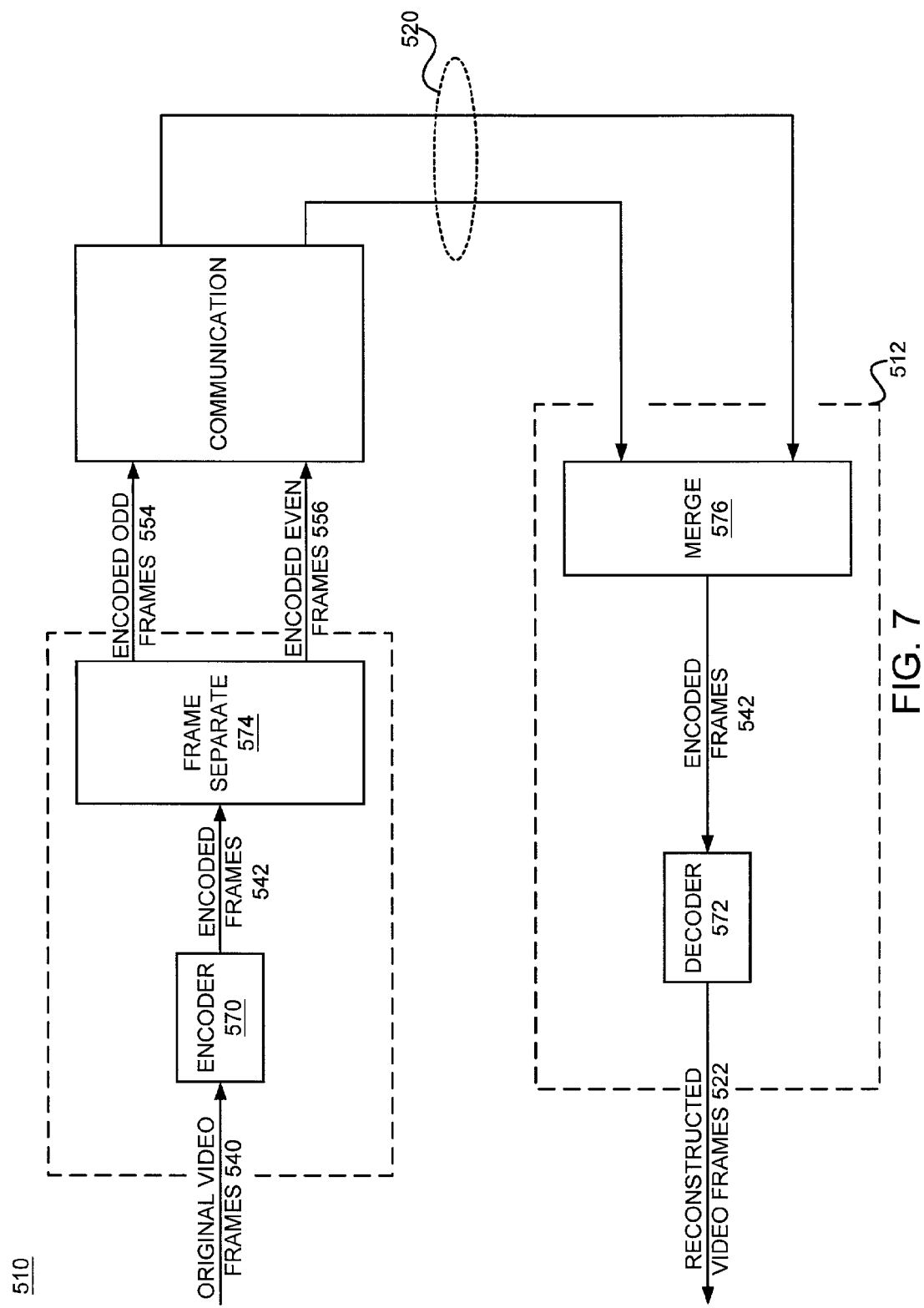
FIG. 7 illustrates a video communication system according to another embodiment of the present invention.

FIG. 7 illustrates a video communication system according to another embodiment of the present invention. In this embodiment, the sender 510 employs a single encoder 570, and the receiver 512 employs a single decoder 572 to handle the multiple streams 520. In response to the original video frames 540, the encoder 570 generates a series of encoded frames 542 that carry encoded versions of the original video frames 540. A frame separate block 574 in the sender 510 separates the encoded frames 542 into the multiple streams 520, which are the encoded odd and even frames 554 and 556. A merge block 576 in the receiver 512 reassembles in proper order the series of encoded frames 542 from the multiple streams 520. The decoder 572 generates the reconstructed video frames 522 and may perform frame recovery as previously described.

This embodiment saves hardware in the sender 510 and the receiver 512 in comparison to the embodiment in which separate encoder/decoder pairs are used for each of the streams 520. This embodiment is suitable for encoding and decoding according to compression standards in which any given encoded frame in the series of encoded frames 542 can depend on any other preceding frame in the series of encoded frames 542. For example, consider a stream having even frames $P_2, P_4, P_6, P_8, \ldots, P_{2n}$, then this embodiment allows $P_8$, to depend on $P_6$, which depends on $P_4$, etc.

To further clarify this, multiple state encoding may be performed using any encoder which stores the last two previously coded frames (instead of just the last one) and chooses which previously coded frame to use to form the prediction for the current frame to be encoded. Both MPEG-4 Version 2 (with NEWPRED) and H.263 Version 2 (with Reference Picture Selection) support switching prediction among reference frames. Therefore, multiple state encoding may be performed in a standard-compatible manner with the MPEG-4 and H.263 standards.

For example, the multiple state encoder of the present invention can produce a bitstream that is standard-compliant with MPEG-4, H.263, other video compression standards based thereon, and other video compression standards. Furthermore, the multiple state decoder of the present invention can decode an MPEG-4 and H.263 bitstream (or another bitstream whose syntax is defined by another video compression standard) and provide state recovery. Moreover, the multiple state encoded bitstream of the present invention can be made standard compatible with video compression standards, such as MPEG-4, H.263, derivatives based thereon, and other standards.

By designing the system in this manner, any MPEG-4 or H.263 decoder can decode the resulting bitstream. In addition, an enhanced decoder designed to perform state recovery in accordance with the present invention can provide improved error recovery.

Balanced and Unbalanced Operation

The present invention combines multiple state video coding with a path diversity transmission system, where different streams are explicitly transmitted through different network paths, to improve the effectiveness of multiple state coding over a packet network by increasing the likelihood that the loss probabilities for each stream are independent.

When using multiple paths each path may have different characteristics, such as bandwidth, packet loss rate, delay, and other forms of quality of service. In addition, the characteristics of each path in a packet network are time-varying. Consequently, it would be desirable and important to be able to adjust the video coding and transmission to be appropriate for the characteristics of each path.

For example, in the case of using two paths, the available bandwidth in each path may be similar or different. In the case that the bandwidth in each path is the same, then the video coding can code each stream to be at the same bit rate, referred to as balanced operation. In the case that the bandwidth in each path is different, then the video coding should adapt the coding of each stream to be at the appropriate rate for its respective path, referred to as unbalanced operation. It is important that the video communication system be effective in both balanced and unbalanced operation.

Figure 11:
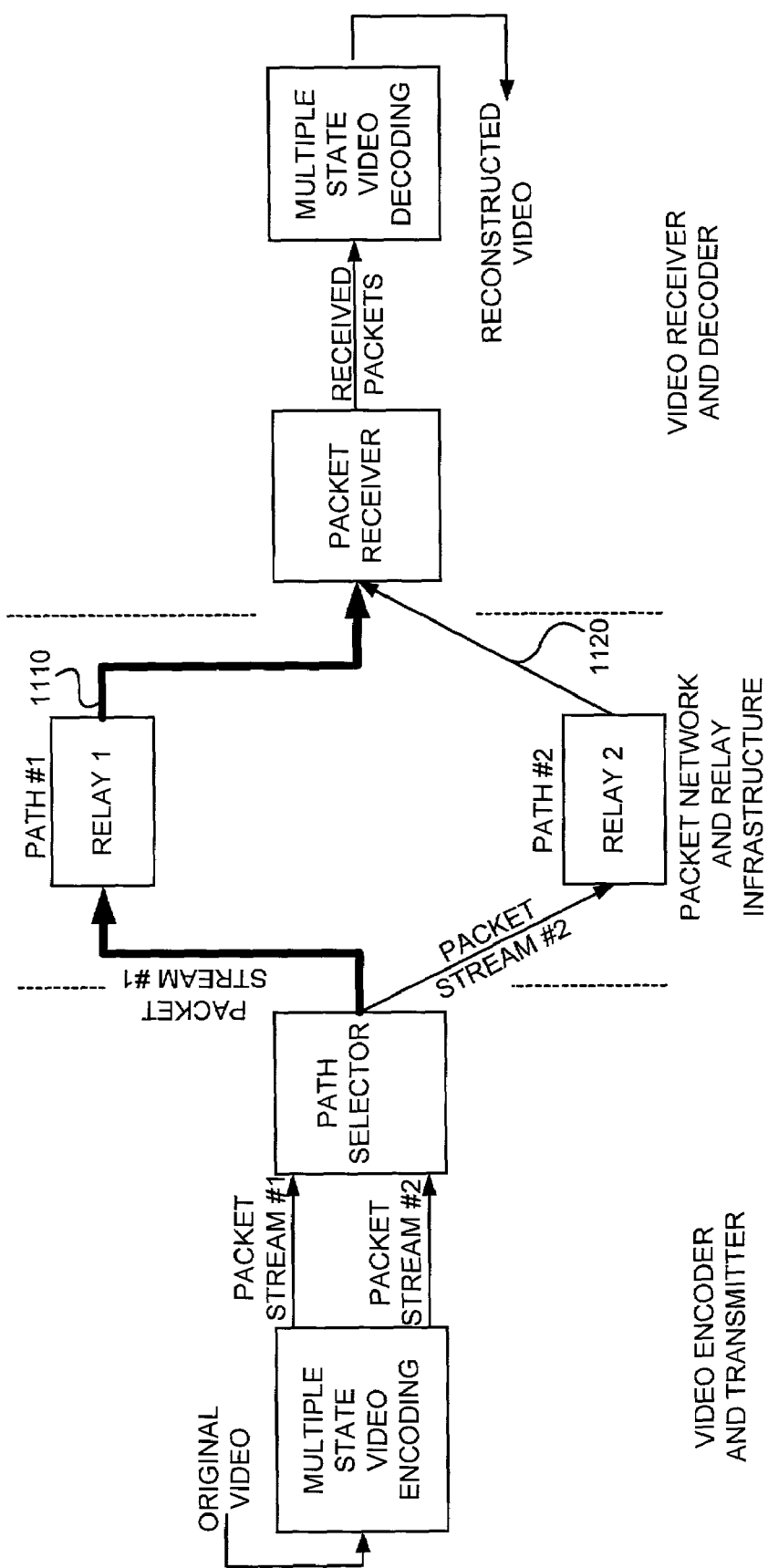
FIG. 11 illustrates a video communication system having unbalanced operation in accordance with one embodiment of the present invention.

FIG. 11 illustrates an example of multiple state encoding with two streams and a relay-based path diversity system with two paths (i.e., a first path 1110 and a second path 1120). It is noted that the first path 1110 has a bandwidth greater than the bandwidth of the second path 1120. In other words, this system is unbalanced with path #1 supporting a larger bandwidth than path #2.

The present invention can adjust the video coding and transmission to be appropriate for the characteristics of each path. The multiple state coding method is naturally balanced (assuming the even and odd frames have equal complexity).

In order to achieve unbalanced required rates, the present invention can selectively adapt the quantization, frame rate, or spatial resolution of the coding of a stream. In particular, the present invention can dynamically adapt the frame rate in order to reduce the required bit rate, while largely preserving the error recovery capability.

In general, it is important to preserve approximately equal quality in each stream. Otherwise, an observer may perceive a quality variation as a flicker at half the original frame rate, particularly for the case with no losses. The present invention can employ rate control via coarser quantization for small rate changes (e.g. 0–20% rate reduction). However, rate control via coarser quantization probably should not be used to achieve much larger changes. Changes in spatial resolution may also be performed, while ensuring that the quality of the different streams is approximately equal to reduce the potential flicker.

Frame rate changes provide a simple mechanism for adapting the rate while preserving the quality per frame and largely preserving the error recovery performance. Specifically, the changes may be in the form of reducing the frame rate in a uniform manner (useful for large rate reductions, e.g. 40–50%) or skipping frames at periodic or random intervals (useful for smaller rate reductions 0–40%). For example, skipping one frame/s (out of 15 frames/s) yields a reduction of about 6% (depending on the specific video), 2 skipped yields 12%, 3 skipped 18%, . . . , and 7.5 skipped (skipping every other frame) yields about 45%. When skipping frames, it is important not to skip two consecutive frames in order to preserve compression efficiency.

For example, if path one supports a rate of R bits/s and path two supports a rate of R/2 bits/s, one can code the video sent over path two at half the frame rate (skip every other frame) as compared to the video sent over path one. This results in almost a factor of two difference in bit rate between the two paths, while preserving equal quality frames in both streams.

The accuracy of the state recovery depends on the quality of the available frames as well as the distance of the available frames from the lost frame. FIG. 12A shows an example of state recovery for balanced multiple state video coding with two streams, and FIG. 12B shows an example of unbalanced multiple state video coding with two streams. In this example of unbalanced coded every other frame is skipped (sub-sampling by a factor of two). The dashed lines show the prediction dependencies between frames. The X's show the lost information. The solid lines show the frames used for performing the state recovery to recover the corrupted frame. In the balanced case the closest frames are spaced by {−T,+T}, while for the unbalanced case they are {−T,+T} for the loss of an even frame and either {−2T,+T} or {−T,+3T} for loss of an odd frame, where T is the frame interval. In the unbalanced case, a loss in the lower rate even stream can be recovered with the same accuracy as in the balanced case. However, a loss in the higher rate odd stream is more difficult to recover from. The state recovery is adjusted in each case to take advantage of the correctly received frames that are closest to the corrupted frame.

Figure 10:
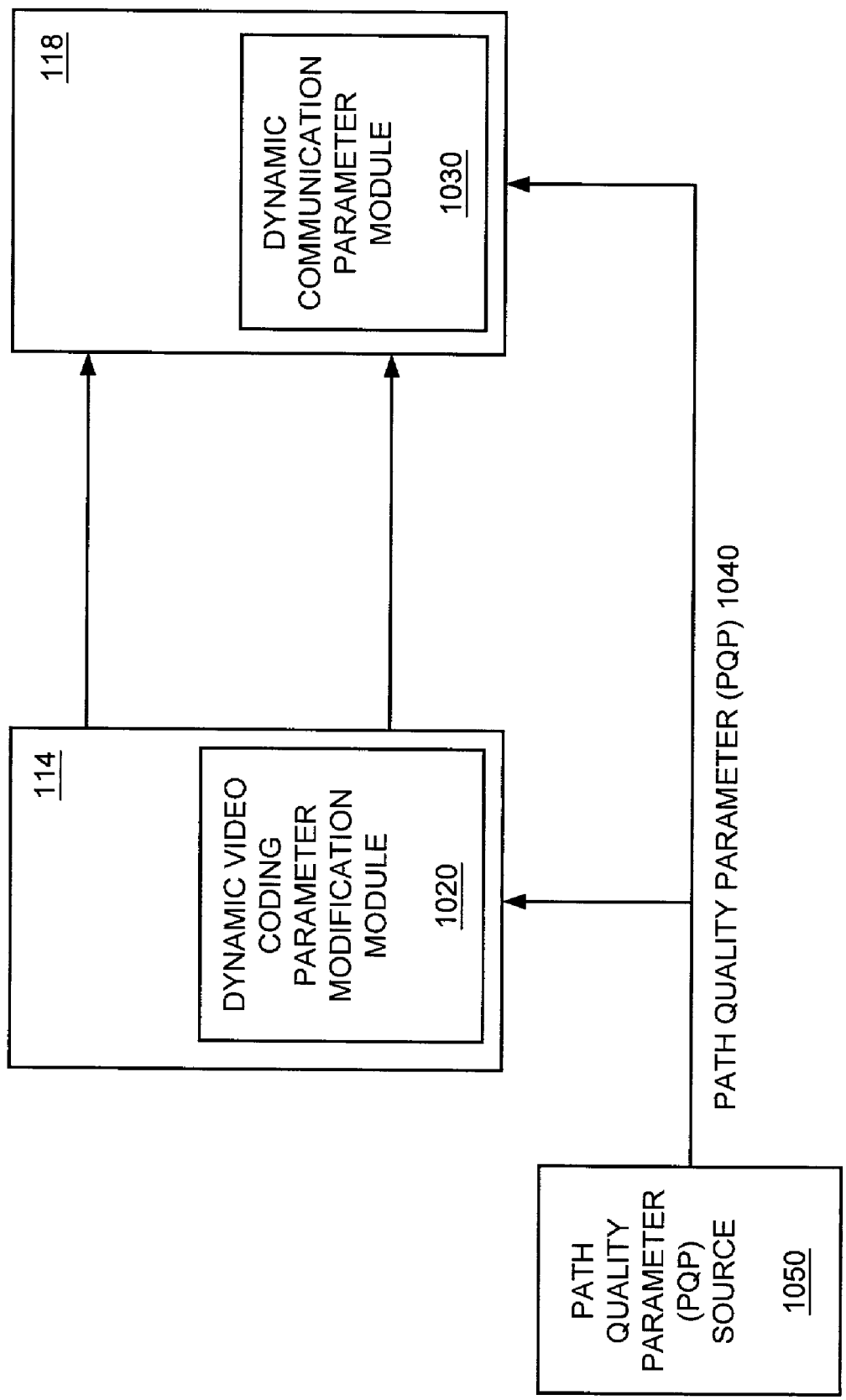
FIG. 10 is a block diagram that illustrates how the encoder dynamically adapts the encoding and communication parameters in response to changes in path quality.

FIG. 10 is a block diagram that illustrates how the encoder dynamically adapts the encoding and communication parameters in response to changes in path quality. The encoder 114 includes a dynamic video coding parameter modification module 1020 for selectively modifying encoding parameters in response to path quality parameters 1040.

The video encoding parameters can include quantization, frame rate, and spatial resolution of the encoding.

The path selector 118 includes a dynamic communication parameter modification module 1030 for selectively modifying the communication parameters in response to path quality parameters 1040.

It is noted that the path quality parameters 1040 are provided by a path quality parameters source 1050. The source 1050 can be the receiver 120 that provides the path quality parameters 1040 via a feedback link or side channel. The path quality parameters 1040 can also be known by the sender 110. For example, in certain types of communication channels, the communication parameters (e.g., available bandwidth) are relatively static and discoverable. The path quality parameter can include bandwidth, packet loss rate, delay, and quality of service parameters.

Other embodiments may employ more than two streams. For example, a set of four streams may carry every encoded fourth frame of the original video frames or a set of five streams may carry every encoded fifth frame of the original video frames.

Still other embodiments may employ streams that include sub-sets of frames that are not uniform. For example, a first stream may contain $frame_1$, $frame_2$, $frame_4$, $frame_5$, $frame_7$, $frame_8$, and a second stream may contain $frame_3$, $frame_6$, $frame_9$, etc.

There are a number of different ways in which the original video can be separated into two or more parts for separate encoding. The video may be split in other ways such as spatially. For example, the video may be split into four quadrants, where each quadrant is coded separately. Alternatively, the video may be split into even and odd interlaced fields, even and odd rows, or even and odd columns. It is noted that the split does not have to be disjoint (i.e., some of the same information may be in multiple streams). For example, some frames (or other information) may be coded into more than one stream.

In still other embodiments, the separation of frames among the streams may be determined dynamically based on the content of the original video frames.

The present techniques may be applied to sub-sets of the original video frames. For example, each of the original video frames may be decomposed into four quadrants and each quadrant may be coded using two or more separate streams. In other words, the present techniques can be applied to a stream that has been divided or otherwise grouped in a temporal fashion or in a spatial fashion.

Furthermore, the number of multiple streams may be chosen adaptively and may be changed dynamically based on the communication conditions. For example, when a communication channel is very good, and there are very few losses, it may be appropriate to have two streams or only a single stream. However, if the communication becomes worse with many losses, it may be appropriate to change the number of streams to three or four or more.

The receiver may notify the sender of communication losses using, for example, a back channel. The sender can then use this information to dynamically adapt its coding. For example, when communication losses are relatively low, then the video may be coded with only a single state to generate a single stream, which is sent over a single path. On the other hand, when communication losses are relatively high, then the video may be coded using multiple states to generate multiple independently decodable streams, each of which is sent over a separate path.

The video communication system of the present invention can be applied in a wide variety of applications, such as digital television systems, Internet video systems, and wireless video systems. In each of these applications, a communication link is employed to carry the digital video. In these systems, a digital video originates in a sender and is transferred to one or more receivers via one or more communication links. For example, in a digital television system, a broadcast station transmits to one or more digital television receivers via over-the-air or cable communication links. In an Internet video system, as another example, a server typically acts as a sender that transfers digital video to one or more web client receivers via the Internet.

Connections to the Source

In certain instances, a source may be connected to the rest of the world via a number of connections. For example, a company can have connections with multiple Internet Service Providers (ISPs) for fault tolerance. For example, when one ISP has a catastrophic failure or goes bankrupt, the company can simply switch to using one of the other ISPs without disrupting its operations.

In this case, path diversity can be achieved by directing different streams of packets to each of the different ISPs. Since each ISP has its own local network, sending different streams of packets to each ISP corresponds to each stream traversing a separate path.

In certain instances, a source may be connected to the rest of the world via a number of technologies. For example, a source may be connected via a conventional wired network, a cellular network, and a satellite link. In this case, path diversity can be achieved by directing different streams of packets through each of the different technologies. Since each technology has its own network, sending different streams of packets to each technology corresponds to each stream traversing a separate path. For example, one stream of packets may be sent via a satellite link while another stream of packets may be sent via a conventional wired link. These two streams traverse different paths.

In a cellular environment, a source may be able to connect to multiple base stations. In this case, the source can send a different stream to each base station, thereby sending each stream over a separate path.

In communicating to a client in a wireless (e.g. wireless LAN) or cellular environment, the destination may be able to receive data from multiple transmitters at the same time. Therefore, by sending different streams through the different transmitters, the destination can receive the data from different paths.

This is an example of when the infrastructure decides how to deliver the information to the destination. The infrastructure can identify that the destination can receive data from multiple transmitters, and therefore, transmits different streams of packets through the different transmitters.

In an environment similar to Digital Television, one stream of data may be broadcast over the wireless spectrum, and another stream transmitted over a wired network, such as cable.

In a different scenario, one stream may be broadcast over a wireless channel (similar to television), and separate wireless transmitters may be placed in different hard-to-reach areas. The separate wireless transmitters are then employed to transmit a different stream. This scenario is especially useful in areas where there are mountains, skyscrapers, other obstacles or barriers.

In the above scenarios, the different streams typically contain different sub-sets of packets. However, in certain cases it may be beneficial to send the same packets in more than one stream.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method of communicating video from a sender to a receiver over a network comprising:
   receiving a frame;
   accessing information that characterizes a first path in the network and information that characterizes a second path in the network that includes a relay device not on the first path;
   determining if the frame is from a first sub-sequence of frames;
   when the frame is from the first sub-sequence of frames, encoding the frame using video encoding parameters that are selected according to the information that characterizes the first path, packetizing the frame into at least a packet, and sending the packet via the first path; and
   otherwise, when the frame is from a second sub-sequence of frames and not from the first sub-sequence of frames, encoding the frame using video encoding parameters that are selected according to the information that characterizes the second path, packetizing the frame into at least a packet, and sending the packet via the second path.

2. The method of claim 1 wherein the first sub-sequence and the second sub-sequence are selected based on time or space.

3. The method of claim 1 wherein the step of determining if the frame is from a first sub-sequence of frames includes determining if the frame is an odd frame or an even frame.

4. The method of claim 1 wherein the packet includes a label for identifying whether the packet is part of the first sub-sequence or part of the second sub-sequence.

5. The method of claim 1 further comprising:
   determining if a packet is from the first sub-sequence;
   when the packet is from the first sub-sequence, decoding the packet;
   determining if there is an error in the packet;
   when there is an error, determining if a reduced frame rate is acceptable;
   when the reduced frame rate is acceptable, displaying the video at the reduced frame rate by employing frames from the second sub-sequence;
   when the reduced frame rate is not acceptable, performing state recovery on the frame by employing one of a previous frame and a future frame from one of the first sub-sequence and the second sub-sequence.

6. The method of claim 1 further comprising:
   determining if the packet is from the first sub-sequence;
   when the packet is from the first sub-sequence, decoding the packet;
   determining if there is an error in the packet;
   when there is an error, performing state recovery on the frame by employing one of a previous frame and a future frame from one of the first sub-sequence and the second sub-sequence.

7. The method of claim 6 wherein the step of performing state recovery on the frame by employing one of a previous frame and a future frame from one of the first sub-sequence and the second sub-sequence includes:
   estimating a lost frame;
   employing an estimate of the lost frame in future decoding; and
   displaying the estimate of the lost frame.

8. A system of communicating video from a sender to a receiver over a network comprising:
   a separator for receiving a first frame with a sub-sequence identifier field and specifying the sub-sequence identifier field of the first frame with one of a first sub-sequence identifier and of a second sub-sequence identifier based on a predetermined criteria;
   an encoder coupled to the separator for encoding the first frame, wherein the encoder accesses information that characterizes a first path in the network and information that characterizes a second path in the network that includes a relay device not on the first path; and
   a transmitter for selecting a path from one of the first path and the second path based on the sub-sequence identifier field, wherein the encoder uses video encoding parameters to encode the first frame, the video encoding parameters selected according to the information that characterizes the path selected.

9. The system of claim 8 further comprising:
   a receiver for receiving the first frame;
   a decoder coupled to the receiver for decoding the first frame and determining if there is an error in the first frame; and
   a state recovery unit coupled to the decoder for performing state recovery on the first frame by employing one of a previous frame and a future frame when there is an error.

10. The system of claim 8 further comprising:
    a sender for estimating the quality of the state recovery by employing multiple states and comparing a recovered corrupted stream with a known correctly received stream.

11. The method of claim 1 further comprising:
    receiving at least one path quality parameter; and
    in response to the path quality parameter dynamically modifying at least one video encoding parameter.

12. The method of claim 11 wherein the path quality parameter is provided through a feedback link with the receiver.

13. The method of claim 11 wherein the video encoding parameter includes quantization, frame rate, and spatial resolution of the encoding.

14. The method of claim 11 further comprising:
    receiving the at least one path quality parameter; and
    in response to the path quality parameter dynamically modifying at least one communication parameter.

15. The method of claim 14 wherein the communication parameter includes number of paths and path configuration.

16. The method of claim 14 wherein the path quality parameter includes bandwidth, packet loss rate, delay, and quality of service.

17. The method of claim 15 wherein the number of paths is dynamically modified to be one path.

18. A method for communicating an original series of video frames over a network comprising;
    receiving the original series of video frames;
    separating the original series of video frames into odd video frames and even video frames;
    encoding the odd video frames to encoded odd video frames;
    encoding the even video frames to encoded even video frames; wherein the encoded odd video frames and the encoded even video frames are independently decodable;

transmitting the encoded odd video frames by employing a first path over the network, wherein relay devices on the first path are explicitly specified prior to the transmitting of the encoded odd video frames; and transmitting the encoded even video frames by employing a second path over the network, wherein relay devices on the second path are explicitly specified prior to the transmitting of the encoded even video frames, the second path comprising a relay device that is not on the first path.

19. The method of claim 18 further comprising:

receiving the encoded odd video frames;

receiving the encoded even video frames;

decoding the encoded odd video frames to generate re-constructed odd video frames;

decoding the encoded even video frames to generate re-constructed even video frames; and merging the re-constructed odd video frames and re-constructed even video frames to recover the original video frames.

20. The method of claim 18 further comprising:

receiving the encoded odd video frames;

receiving the encoded even video frames;

merging the encoded odd video frames and encoded even video frames to generate a composite series of encoded frames; and decoding the series of composite encoded video frames to recover the original video frames.

* * * * *